US012343699B2

(12) United States Patent
Sitton et al.

(10) Patent No.: US 12,343,699 B2
(45) Date of Patent: Jul. 1, 2025

(54) TITANIUM-ALUMINUM-ZIRCONIUM METAL OXIDES

(71) Applicant: NEOGEN FOOD SAFETY US HOLDCO CORPORATION, Lansing, MI (US)

(72) Inventors: Gregory W. Sitton, Minneapolis, MN (US); Fuxia Sun, Woodbury, MN (US); Sarah A. Sykora, New Richmond, WI (US); Leslie M. Horton, Hugo, MN (US)

(73) Assignee: NEOGEN FOOD SAFETY US HOLDCO CORPORATION, Lansing, MI (US)

( * ) Notice: Subject to any disclaimer, the term of this patent is extended or adjusted under 35 U.S.C. 154(b) by 1178 days.

(21) Appl. No.: 17/258,204

(22) PCT Filed: Jun. 28, 2019

(86) PCT No.: PCT/IB2019/055527
§ 371 (c)(1),
(2) Date: Jan. 6, 2021

(87) PCT Pub. No.: WO2020/012289
PCT Pub. Date: Jan. 16, 2020

(65) Prior Publication Data
US 2021/0268473 A1    Sep. 2, 2021

Related U.S. Application Data

(60) Provisional application No. 62/695,292, filed on Jul. 9, 2018.

(51) Int. Cl.
| | | |
|---|---|---|
| *A61K 8/28* | (2006.01) | |
| *A23K 10/30* | (2016.01) | |
| *A23L 5/20* | (2016.01) | |
| *B01D 11/02* | (2006.01) | |
| *B01D 15/42* | (2006.01) | |
| *B01J 20/08* | (2006.01) | |
| *B01J 20/281* | (2006.01) | |
| *C01G 25/00* | (2006.01) | |

(52) U.S. Cl.
CPC ........... *B01J 20/08* (2013.01); *A23K 10/30* (2016.05); *A23L 5/276* (2016.08); *B01D 11/0288* (2013.01); *B01D 11/0292* (2013.01); *B01D 15/424* (2013.01); *B01J 20/281* (2013.01); *C01G 25/006* (2013.01); *A23V 2002/00* (2013.01); *B01J 2220/54* (2013.01); *B01J 2220/58* (2013.01); *C01P 2002/50* (2013.01)

(58) Field of Classification Search
None
See application file for complete search history.

(56) References Cited

U.S. PATENT DOCUMENTS

| | | | |
|---|---|---|---|
| 6,417,423 B1 | 7/2002 | Koper | |
| 7,731,837 B2 | 6/2010 | Song | |
| 2006/0234463 A1* | 10/2006 | Avellan | ............. H01L 29/66181 |
| | | | 438/785 |

FOREIGN PATENT DOCUMENTS

JP    H08164447 A  *  6/1996

OTHER PUBLICATIONS

Saeidi et al. "Characterization and microstructure investigation of novel ternary ZrO2—Al2O3—TiO2 composites synthesized by citrate nitrate process", J Sol-Gel Sc Technol 76:436-445 (Year: 2015).*
Bekker et al. "Towards the investigation of ternary compound in the Ti—Al—Zr—O system: Effect of oxygen fugacity on phase formation", Journal of the European Ceramic Society 40: 3663-3672. (Year: 2020).*
Maragos, "Extraction of Aflatoxin B1 and G1 from Maize using Aqueous Sodium Dodecylsulfate (SDS)", Journal of Association of Official Analytical Chemists International, 2008, vol. 91, No. 4, pp. 762-767.
Product Brochure entitled "PuriTox Total Myco-MS—Product Code: TC-MT3000", A Product Manufactured by Trilogy Analytical Labortory, Inc. USA, (date unknown but believed to be prior to the date of the filing of the present application), 16 pages.
Product Flyer entitled "MycoSep® 226 AflaZon+ Push-through format", A Product from Romer Labs, Inc. USA, (www.romerlabs.com) (date unknown but believed to be prior to the date of the filing of the present application), 1 page.
Saeidi, "Characterization and Microstructure Investigation of Novel Ternary $ZrO_2$—$Al_2O_3$—$TiO_2$ Composites Synthesized by Citrate-Nitrate Process", Journal of Sol-Gel Science and Technology, Jul. 2015, vol. 76, No. 2, pp. 436-445, XP035533379.
International Search Report for PCT International Application No. PCT/IB2019/055527, mailed on Jan. 7, 2020, 4 pages.
Jiao Y et al., "Catalytic cracking of RP-3 jet fuel over wall-coated Pt/ZrxTi09-xAl0.1O2 mixed oxides catalysts," 2015, *Applied Thermal Engineering*, 91:417-25.

(Continued)

*Primary Examiner* — Susan T Tran
(74) *Attorney, Agent, or Firm* — HYLTON-RODIC LAW PLLC

(57) ABSTRACT

A Ti—Al—Zr—O metal oxide having the formula $Ti_xAl_yZr_zO_n$, wherein x is independently 2-10, y is independently 0.5-6, z is independently 2-10, and n is independently 2x+3y/2+2z. A method of separating a mycotoxin from a matrix using a Ti—Al—Zr—O metal oxide.

7 Claims, No Drawings

(56) References Cited

OTHER PUBLICATIONS

Shilova O.A. et al., "Ceramic Nanocomposites Based on Oxides of Transition Metals for Ionistors," 2013, *Glass Physics*, 39(5):570-78.
Zhang et al., "Catalytic Performance of MnOxCeO2/Ti0.25Zr0.25Al0.5O1.75 Monolith Catalyst for Low Temperature Selective Catalytic Reduction of NO with HH3," 2009, *Chinese Journal of Inorganic Chemistry*, 25(3):485-90.

* cited by examiner

TITANIUM-ALUMINUM-ZIRCONIUM METAL OXIDES

CROSS REFERENCE TO RELATED APPLICATIONS

This application is a national stage filing under 35 U.S.C. 371 of PCT/IB2019/055527, filed 28 Jun. 2019, which claims the benefit of U.S. Provisional Application No. 62/695,292, filed 9 Jul. 2018, the disclosures of which are incorporated by reference in their entireties herein.

BACKGROUND

Mycotoxins, such as aflatoxins, are highly dangerous materials found inorganic matrices, for example food matrices such as grain matrices. Mycotoxins can be injurious or even lethal to human or non-human animals even at low concentrations.

Mixed metal sorbents containing the elements Ti and O are described in U.S. Pat. No. 7,731,837.

SUMMARY

A Ti—Al—Zr—O metal oxide can have the formula $Ti_xAl_yZr_zO_n$, wherein x is independently 2-10, y is independently 0.5-6, z is independently 2-10, and n is independently $2x+3y/2+2z$.

A method of separating a mycotoxin from a matrix comprising the mycotoxin can comprise contacting the matrix with an extractant selected from short-chained alcohol and mixture of water and short-chained alcohol to extract a portion of the mycotoxin from the matrix into the extractant to form a supernatant, wherein the supernatant comprises dissolved or dispersed mycotoxin. At least a portion of supernatant can then be contacted with a Ti—Al—Zr—O metal oxide.

DETAILED DESCRIPTION

Throughout this disclosure, singular forms such as "a," "an," and "the" are often used for convenience; however, the singular forms are meant to include the plural unless the singular alone is explicitly specified or is clearly indicated by the context. When the singular alone is called for, the term "one and only one" is typically used.

Some terms in this disclosure are defined below. Other terms will be familiar to the person of skill in the art, and should be afforded the meaning that a person of ordinary skill in the art would have ascribed to them.

The terms "common," "typical," and "usual," as well as "commonly," "typically," and "usually" are used herein to refer to features that are often employed in the invention and, unless specifically used with reference to the prior art, are not intended to mean that the features are present in the prior art, much less that those features are common, usual, or typical in the prior art.

"Short-chained alcohol," as well as its plural, refers to straight chained, cyclic, or branched lower alkyl or lower alkene alcohol compounds. Short-chained alcohols are typically lower straight chained or branched lower alkyl alcohols. Common lower alkyl alcohols have four or fewer carbon atoms, such as butanol, for example n-butanol, sec-butanol, iso-butanol, and tert-butanol, propanol, such as n-propanol and isopropanol, ethanol and methanol. Methanol and ethanol are most commonly employed in this disclosure, with methanol being used more frequently in the disclosure than ethanol.

"ppb" is an abbreviation for "parts per billion," which is a term known in the art.

"ppm" is an abbreviation for "parts per million," which is a term known in the art.

In this disclosure, all percentages, whether designated with the word "percent," the percent sign (%) or otherwise, are weight percentages unless otherwise specified.

In this disclosure, all ratios of liquids are volume ratios, unless otherwise specified.

Detecting, and particularly quantifying the amount of mycotoxin, such as aflatoxin, in an organic matrix, for example a food matrix, such as a grain matrix, is challenging for many reasons. One reason is the presence of thousands, tens of thousands, or even more, organic compounds other than the mycotoxin. Even analytical techniques that might be able to detect or quantify extraordinarily low levels, such as 20 ppb or less, 10 ppb or less, or even 5 ppb or less of mycotoxin, such as aflatoxin, when the mycotoxin is the sole compound present in a dispersion or solution are difficult to apply to an organic matrix, for example a food matrix such as a grain matrix.

Thus, it is advantageous, and in most cases necessary, to remove some, and preferably a large portion of, compounds other than the mycotoxin, such as aflatoxin, before conducting further analysis. This can be achieved by separating mycotoxin, such as aflatoxin, from the organic matrix, for example a food matrix such as a grain matrix.

Known methods of conducting such separations exist. For example, the MYCOSEP 226 AFLAZON+ system (available from Romer Labs, MO, USA) requires that the food matrix be extracted with the solvent acetonitrile (sometimes referred to as AcN) which must be evaporated to dryness after separation before any analysis can be conducted. Similarly, the PuriTox Total Myco-MS system (available from R-Biopharm Rhône, LTD, Glasgow, Scotland, UK) requires the use of both acetonitrile and glacial acetic acid to prepare the sample, plus additional dilute acetic acid and acetonitrile that must be added to the sample after it is passed through a chromatography column.

The inventors have identified several technical problems with these known methods. First, the known methods are very labor intensive, requiring multiple steps both before and after eluting the sample through a separation column. Second, the known methods require the use of solvents and other reagents that are expensive or dangerous to the user, such as acetic acid, acetonitrile, and the like. Thus, one technical problem that may be solved is how reduce the number of residual compounds (that is, compounds other than the mycotoxin, typically aflatoxin, analyte) in a food matrix, typically a grain matrix, without the need for expensive or dangerous solvents and instead primarily using common solvents such as water and short-chain alcohols. Another technical problem that may be solved is making the separation of mycotoxins, such as aflatoxins, from a food matrix, typically a grain matrix, less labor intensive. Another related technical problem that may be solved is how to separate mycotoxins, such as aflatoxins, from a matrix, such as a food matrix, without the need for additional steps after passing the sample through a chromatography column. Another technical problem that may be solved is how to reduce the amount of required, and particularly the amount of dilution required, for the separation of mycotoxins such as aflatoxin from a food matrix, such as a grain matrix. Still another related technical problem that may be solved in how to use a Ti—Al—Zr—O oxide in mycotoxin separation from a food matrix.

In brief, these technical problems, as well as others, can be solved by the use of a titanium-aluminum-zirconium oxide (Ti—Al—Zr—O metal oxide) sorbent as described herein, and particularly by its use as the stationary phase in a chromatography column. Use of this material permits separation of the mycotoxin or aflatoxin from the matrix with good recovery when an alcohol or water-alcohol mixture is used for extraction. When the Ti—Al—Zr—O metal oxide is used, a highly dilute solution of the extract is not required, and after eluting the extract through the column the eluent can be used directly for further analysis, such as HPLC analysis, without the need for further processing steps.

The sorbent is a Ti—Al—Zr—O metal oxide. Typically, it has the chemical formula $Ti_xAl_yZr_zO_n$, wherein independently 2-10, y is independently 0.5-6, z is independently 2-10, and n is independently 2x+3y/2+2z. In some cases, x is independently 6-10, y is independently 0.5-4, z is independently 6-10, and n is independently 2x+3y/2+2z. In this formula, particular values for x can be 2 or greater, 2.5 or greater, 3 or greater, 3.5 or greater. 4 or greater, 4.5 or greater, 5 or greater. 5.5 or greater, 6 or greater, 6.5 or greater, 7 or greater, 7.5 or greater, 8 or greater, 8.5 or greater, 9 or greater, 9.5 or greater; particular values for x can also be 10 or less, 9.5 or less, 9 or less, 8.5 or less, 8 or less, 7.5 or less, 7 or less, 6.5 or less, 6 or less, 5.5 or less, 5 or less, 4.5 or less, 4.0 or less, 3.5 or less, 3.0 or less, or 2.5 or less. Particular values for y can be 0.5 or greater, 1 or greater, 1.5 or greater, 2 or greater, 2.5 or greater, 3 or greater, 3.5 or greater, 4.0 or greater, 4.5 or greater, 5.0 or greater, or 5.5 or greater. Particular values for y can be 6 or less, 5.5 or less, 5 or less, 4.5 or less, 4 or less, 3.5 or less, 3 or less, 2.5 or less, 2 or less, 1.5 or less, or 1 or less. In this formula, particular values for z can be 2 or greater, 2.5 or greater, 3 or greater, 3.5 or greater. 4 or greater, 4.5 or greater, 5 or greater. 5.5 or greater, 6 or greater, 6.5 or greater, 7 or greater, 7.5 or greater, 8 or greater, 8.5 or greater, 9 or greater, 9.5 or greater; particular values for x can also be 10 or less, 9.5 or less, 9 or less, 8.5 or less, 8 or less, 7.5 or less, 7 or less, 6.5 or less, 6 or less, 5.5 or less, 5 or less, 4.5 or less, 4.0 or less, 3.5 or less, 3.0 or less, or 2.5 or less. Most commonly, x is 3-5, and in particular cases 4-5. Most commonly, y is 0.75-3, and even more commonly 0.75-2.5. Most commonly, z is 2 to 5, and even more commonly 2 to 4. In certain cases, the Ti—Al—Zr—O metal oxide has the chemical formula $Ti_8Al_2Zr_8O_{35}$. In certain cases, Ti—Al—Zr—O metal oxide has the chemical formula $Ti_{4.7}AlZr_{2.5}O_{15.9}$.

The Ti—Al—Zr—O metal oxide sorbent can be prepared by any suitable method. Typically, the sorbent is prepared in solution, such as in an aqueous solution, by reaction of salts of Ti, Al and Zr. In many cases, a reducing agent is also used. Urea is a typical reducing agent, although other reducing agents, such as hydride sources, such as LAlH, sodium borohydride, or Lindlar's catalyst, ammonia, diborane, dithionates, thiosulfates, hydrazine, DIBAL-H, reducing sugars, phosphites such as hypophosphites, dithiothreitol, cyanides, and tris-2-carbozyethyphosphine hydrochloride (TCEP) can also be used in some cases. Most commonly a water soluble reducing agent is used so that any remaining reducing agent can be removed by washing the product with water. Urea is most commonly used as the reducing agent.

An aqueous dispersion of salts of the metals, along with the reducing agent, which is most often urea, can be made at room temperature. The metal salts typically contain metals having the following oxidation states: Ti (IV), Al (III), and Zr (IV), at the appropriate stoichiometry. However, it is possible to use other oxidation states of those metals, in which case the metals can be oxidized or reduced in situ to form the final product. The dispersion can be heated to a temperature sufficient to support a chemical reaction between the reagents. The dispersion is typically heated to a temperature between 75° C. and the boiling point of the water (which may be more than 100° C. because of the dissolved materials). Most commonly, the temperature will be between 90° C. and 100° C. The dispersion can be maintained for a time sufficient to complete the reaction, typically between 1 and 6 hours, although longer or shorter periods of time may be required depending on the particular salts used, the concentration of the salts, the ionic strength of the water, and other factors. After the reaction is complete, the dispersion can be cooled to room temperature and the resulting powder collected, for example by decanting or by filtration. The powder can then be washed, for example with organic solvents, ambient temperature deionized water, or both, to remove impurities. Finally, the powder can be calcined, typically at a temperature between 200° C. and 800° C. for 1 to 8 hours in order to obtain the Ti—Al—Zr—O metal oxide.

The Ti—Al—Zr—O metal oxide can be used in a method of separating mycotoxins, such as aflatoxins, from a matrix, for example a food matrix such as a grain matrix. When the food matrix is a grain matrix, the matrix often comprises one or more of corn matrix, wheat matrix, barley matrix, spelt matrix, rice matrix, rye matrix, oat matrix, or the like. Though the method can be used with these or other food matrixes, corn matrix is most commonly employed because of its industrial importance as animal feed.

The separation of mycotoxin, such as aflatoxin, does not require that all compounds other than mycotoxin, such as aflatoxin, be retained on the sorbent nor does it require that the mycotoxin, such as aflatoxin, have any specific degree of purity. Instead, a separation is deemed successful if the mycotoxin, such as aflatoxin, is sufficiently pure that it can be reliably detected and analyzed, and preferably quantified, without an undue chance of mistaking it for another compound.

To effect separation, the matrix can be optionally ground up into small particles. A mass of the matrix, most commonly a known mass, which can optionally be ground, is contacted with a short-chained alcohol, or more commonly a mixture of water and short-chained alcohol. The mixture of water and short chained alcohol can be any mixture that is suitable to reliably extract the mycotoxin, such as the aflatoxin, from the matrix. Suitable mixtures most often have 20% to 80% short-chained alcohol. Exemplary mixtures can have 20% or more, 25% or more, 30% or more, 35% or more, 40% or more, 45% or more, 50% or more, 55% or more, 60% or more, 65% or more, 70% or more, or even 75% or more short-chained alcohol. Exemplary mixtures can have 80% or less, 75% or less, 70% or less, 65% or less, 60% or less, 55% or less, 50% or less, 45% or less, 40% or less, 35% or less, 30% or less, or even 25% or less short-chained alcohol. Typical mixtures have 30% to 70% short-chained alcohol, r, and even more typically 40% to 60%, such as 45% to 55% or even 50% short-chained alcohol.

Any suitable short-chained alcohol can be used. The short-chained alcohol is usually selected so that it forms a solution with the water in the short-chained alcohol/water mixture. Typically, methanol or ethanol are used. Methanol is most common.

It is possible for small amounts of other chemicals or solvents to be present in the mixture of water and short-chained alcohol. For example, denatured ethanol or rubbing alcohol, both of which often contain small quantities of other solvents such as aromatic solvents like benzene or toluene, ketone solvents such as acetone or methyl ethyl ketone, or ester solvents such ethyl acetate or butyl acetate, is used as the short-chained alcohol, then it is not necessary to remove such additional solvents from the denatured ethanol or rubbing alcohol before use. Thus, when a short-chained alcohol or a mixture of water and short-chained alcohol is called for, it should be understood that some other solvents may be present as well, typically in no more than trace amounts, usually because of their presence as impurities in the short-chained alcohol.

Contacting the matrix with the short-chained alcohol or mixture of water and short-chained alcohol typically comprises placing the short-chained alcohol or mixture of water and short-chained alcohol and the matrix in a vessel and agitating the vessel. Agitating can be by way of shaking, such as manual shaking or shaking on an automated shaker, sonication, stirring, or the like. The amount of short-chained alcohol or mixture of water and short-chained alcohol can be any suitable amount. Most suitable amounts will reliably extract all or essentially all of the mycotoxin, such as aflatoxin, from the matrix. Multiple extractions can be employed, as can soxhlet extractions as well as other techniques in the separation arts for extracting materials from solids.

The solid from the matrix can be separated from the supernatant by any suitable means. In some cases, decanting or filtration can be used. When decanting is used, it is often preceded by centrifugation or ultracentrifugation.

The supernatant can be contacted with the Ti—Al—Zr—O metal oxide. This can be accomplished in any suitable way. For example, it is possible to mix a powder of the Ti—Al—Zr—O metal oxide with the supernatant and agitate the mixture, for example by shaking or sonication. The Ti—Al—Zr—O can then be removed from the liquid supernatant, for example by decanting or filtration.

More commonly, the step of contacting the Ti—Al—Zr—O metal oxide with the supernatant is achieved by making a column from the Ti—Al—Zr—O metal oxide and passing the supernatant through the column. A column of the Ti—Al—Zr—O material can be prepared by any suitable method. Typically, the column is either dry-packed or solvent-packed. When solvent-packing is employed, typical solvents that can be employed include water or mixtures of water and ethyl acetate, mixtures of water and butyl acetate, or mixtures of water and acetonitrile.

The column should have sufficient mass of Ti—Al—Zr—O metal oxide and be of a sufficient length to effect good separation of the mycotoxin, such as aflatoxin, as described herein. The mass of the Ti—Al—Zr—O metal oxide in the column can be any mass sufficient to separate the mycotoxin, such as aflatoxin. The mass of Ti—Al—Zr—O metal oxide will depend on the mass of the matrix from which the mycotoxin, such as aflatoxin, is separated. In most cases, the mass of the Ti—Al—Zr—O metal oxide is at two times or more than the mass of the matrix. Greater mass of Ti—Al—Zr—O metal oxide, such as three times or more, four times or more, or even five times or more the mass of the matrix, can be used when needed to effect good separation. Less mass of Ti—Al—Zr—O metal oxide can also be used in some cases. The height of the column can be varied, but is typically at least 2 mm high per mL of liquid to be placed on the column. In many cases, the height of the column can be 5 mm-7 mm per mL of liquid to be placed on the column.

The mobile phase for column separation can be any solvent system that is sufficient to elute the mycotoxin, such as aflatoxin, through the column. However, the solvent should preferably be selected so that it does not elute a large number or large quantity of other compounds through the column such that separation of the mycotoxin, such as aflatoxin, is not achieved. It is, however, acceptable in some cases that a large number or quantity of other compounds elute from the column because many or most those other compounds can still be separated from the mycotoxin by way of collecting fractions of eluent that pass through the column at different times and retaining only those fractions that contain the mycotoxin, such as aflatoxin. Also, compounds that do not interfere with mycotoxin detection or cannot be mistaken for mycotoxin may elute from the column when their presence will not interfere with the detection or quantification of the mycotoxin. The identity and acceptable amount of such compounds will depend on the detection method being used.

Typical solvents used for the mobile phase are mixtures of water and polar organic solvents. Typically, the identity and amount of organic solvent will be selected to form a solution with water. Exemplary organic solvents include acetone, ethyl acetate, butyl acetate, acetonitrile, dimethyl sulfoxide, tetrahydrofuran, diethyl ether, and the like. Most commonly, the mixture of water and polar organic solvent is predominantly water, such as those mixtures having a water content that is 50% or greater, 60% or greater, 70% or greater, 80% or greater, 90% or greater, or even 95% or greater. Acetonitrile is the most commonly used polar organic solvent. The amount of water in a water acetonitrile mixture is typically 80% to 99%, most commonly 85% to 95%, and in many cases 90%.

Additional sorbents can be mixed with the Ti—Al—Zr—O metal oxide in the column. When used, the additional sorbents are typically other metal compounds. Exemplary additional sorbents that can be used include those disclosed in U.S. Pat. No. 7,731,837. When used, the additional sorbents are selected so as not to remove, for example by adsorption, absorption, or other physical or chemical processes, mycotoxin, such as aflatoxin, from the supernatant. When used, the additional sorbents can be present in any suitable amount as a percent of the mixture of Ti—Al—Zr—O metal oxide and the additional sorbents. When used, exemplary amounts of additional sorbents, based on the total mass of Ti—Al—Zr—O metal oxide and the additional sorbents, are 0.5% or greater, 1% or greater, 2.5% or greater, 5% or greater, 10% or greater, 15% or greater, 20% or greater, or even 25% or greater. When used, exemplary amounts of additional sorbents, based on the total mass of Ti—Al—Zr—O metal oxide and the additional sorbents, are 30% or less, 25% or less, 20% or less, 15% or less, 10% or less, 5% or less, 2.5% or less, 1% or less, or even 0.5% or less.

After the separation as described herein, the supernatant, which can be described as an eluent in cases where a column of Ti—Al—Zr—O metal oxide is used, can be analyzed for the presence or amount of mycotoxin, such as aflatoxin. In many cases, only a portion of the supernatant needs to be analyzed; this will depend on the concentration of the mycotoxin, such as aflatoxin, in the supernatant and the specific analysis method that is employed.

The amount of mycotoxin can be the mass of mycotoxin in the supernatant, but is often the concentration of mycotoxin in the supernatant. When the supernatant is a known fraction of the extraction liquid and the mass of the matrix is known, then the amount of mycotoxin, such as aflatoxin, in the matrix can be determined by dimensional analysis once the amount of mycotoxin, such as aflatoxin, in the supernatant is determined.

Any suitable analysis method can be employed. Liquid chromatography methods, including HPLC, are commonly used. HPLC can be conducted with any suitable combination of column and mobile phase. Hydrophobic columns such as C-18 columns are often used, and mobile phases are commonly mixtures of water and acetonitrile. Other columns and mobile phases can be used, depending on the particular mycotoxin, the nature of other compounds that remain in the supernatant, and other relevant factors. Detection can be by any suitable means, most commonly UV/Vis absorbance, but other techniques such as luminescence detection, refractive index detection, and the like can be used.

Analysis can also be by techniques other than HPLC, such as mass spectrometry (MS), nuclear magnetic resonance spectroscopy (NMR), infra-red spectroscopy (IR), or hyphenated techniques such as HPLC-MS.

The following exemplary embodiments are presented to illustrate particular aspects of the disclosure, and are not meant to be limiting. Other embodiments are also disclosed.

1. A Ti—Al—Zr—O metal oxide having the formula $Ti_xAl_yZr_zO_n$, wherein x is independently 2-10, y is independently 0.5-6, z is independently 2-10, and n is independently $2x+3y/2+2z$.

2. The Ti—Al—Zr—O metal oxide of embodiment 1, wherein x is independently 6-10, y is independently 0.5-4, z is independently 6-10, and n is independently $2x+3y/2+2z$.

3. The Ti—Al—Zr—O metal oxide of any of the preceding embodiments, wherein x is 2 or greater, 2.5 or greater, 3 or greater, 3.5 or greater. 4 or greater, 4.5 or greater, 5 or greater. 5.5 or greater, 6 or greater, 6.5 or greater, 7 or greater, 7.5 or greater, 8 or greater, 8.5 or greater, 9 or greater, 9.5 or greater.

4. The Ti—Al—Zr—O metal oxide of any of the preceding embodiments, wherein x is 10 or less, 9.5 or less, 9 or less, 8.5 or less, 8 or less, 7.5 or less, 7 or less, 6.5 or less, 6 or less, 5.5 or less, 5 or less, 4.5 or less, 4.0 or less, 3.5 or less, 3.0 or less, or 2.5 or less.

5. The Ti—Al—Zr—O metal oxide of any of the preceding embodiments, wherein y is 0.5 or greater, 1 or greater, 1.5 or greater, 2 or greater, 2.5 or greater, 3 or greater, 3.5 or greater, 4.0 or greater, 4.5 or greater, 5.0 or greater, or 5.5 or greater.

6. The Ti—Al—Zr—O metal oxide of any of the preceding embodiments, wherein y is 6 or less, 5.5 or less, 5 or less, 4.5 or less, 4 or less, 3.5 or less, 3 or less, 2.5 or less, 2 or less, 1.5 or less, or 1 or less.

7. The Ti—Al—Zr—O metal oxide of any of the preceding embodiments, wherein z is 2 or greater, 2.5 or greater, 3 or greater, 3.5 or greater. 4 or greater, 4.5 or greater, 5 or greater. 5.5 or greater, 6 or greater, 6.5 or greater, 7 or greater, 7.5 or greater, 8 or greater, 8.5 or greater, 9 or greater, 9.5 or greater.

8. The Ti—Al—Zr—O metal oxide of any of the preceding embodiments, wherein z is 10 or less, 9.5 or less, 9 or less, 8.5 or less, 8 or less, 7.5 or less, 7 or less, 6.5 or less, 6 or less, 5.5 or less, 5 or less, 4.5 or less, 4.0 or less, 3.5 or less, 3.0 or less, or 2.5 or less.

9. The Ti—Al—Zr—O metal oxide of any of the preceding embodiments, wherein x is 3-5, optionally 4-5.

10. The Ti—Al—Zr—O metal oxide of any of the preceding embodiments, wherein y is 0.75-3, optionally 0.75-2.5.

11. The Ti—Al—Zr—O metal oxide of any of the preceding embodiments, wherein, z is 2 to 5, optionally 2 to 4.

12. The Ti—Al—Zr—O metal oxide of any of the preceding embodiments, wherein the Ti—Al—Zr—O metal oxide has the chemical formula $Ti4.7AlZr_{2.5}O_{15.9}$.

13. A method of separating a mycotoxin from a matrix comprising the mycotoxin, the method comprising
    contacting the matrix with an extractant selected from short-chained alcohol and mixture of water and short-chained alcohol to extract a portion of the mycotoxin from the matrix into the extractant to form a supernatant, wherein
    the supernatant comprises dissolved or dispersed mycotoxin;
    contacting at least a portion of supernatant with the Ti—Al—Zr—O metal oxide of any of the previous embodiments.

14. The method of embodiment 13, further comprising the step of grinding the matrix, wherein the grinding step is performed before the step of contacting the matrix with an extractant.

15. The method of any of embodiments 13-14, wherein the matrix is a food matrix.

16. The method of embodiment 15, wherein the matrix is a grain matrix.

17. The method of embodiment 16, wherein the grain matrix comprises one or more of corn matrix, wheat matrix, barley matrix, spelt matrix, rice matrix, rye matrix, oat matrix.

18. The method of embodiment 17, wherein the grain matrix comprises corn matrix.

19. The method of embodiment 17, wherein the grain matrix comprises wheat matrix.

20. The method of embodiment 17, wherein the grain matrix comprises barley matrix.

21. The method of embodiment 17, wherein the grain matrix comprises spelt matrix.

22. The method of embodiment 17, wherein the grain matrix comprises rye matrix.

23. The method of embodiment 17, wherein the grain matrix comprises oat matrix.

24. The method of any of embodiments 13-23, wherein the mycotoxin is an aflatoxin.

25. The method of embodiment 24, wherein the aflatoxin is aflatoxin B1.

26. The method of any of embodiments 13-25, wherein the mycotoxin is deoxynivalenol.

27. The method of any of embodiments 13-26, wherein the step of contacting at least a portion of supernatant with the Ti—Al—Zr—O metal oxide comprises eluting the at least a portion of the supernatant through a column of the Ti—Al—Zr—O metal oxide.

28. The method of any of embodiments 13-27, further comprising the step analyzing at least a portion of the supernatant for the presence or amount of mycotoxin, wherein
    the at least a portion of the supernatant that is analyzed is all or part of the at least a portion of the supernatant that is contacted with the Ti—Al—Zr—O metal oxide; and
    the analyzing step occurs after the step of contacting the supernatant with the Ti—Al—Zr—O metal oxide.

29. The method of embodiment 28, wherein
a liquid component of the at least a portion of the supernatant that undergoes the analyzing step is not evaporated prior to the analyzing step.

EXAMPLES

Preparatory Example 1

Dried field corn was ground in a mill (available from Romer Labs GmbH, Austria, under the trade designation "Romer Series II Mill.") Five grams of the ground corn was added to 25 mL of 1:1 methanol water solution and shaken by repeated inversion for 5 minutes. Aliquots were centrifuged at >5,000 rpm and the supernatants decanted before use to remove solids.

Examples 1-4

Urea (60.0 g) was added to a beaker along with enough water to make a 600 mL solution. Stoichiometric amounts of $TiOSO_4 \cdot 2H_2O$, $Al(NO_3)_3 \cdot 9H_2O$, and $ZrO(NO_3)_2 \cdot xH_2O$ were added to the beaker and the reaction was heated to 94° C. with stirring. After 2 hours at 94° C., the reaction mixture was allowed to cool to room temperature and the solids were collected by filtration, washed with deionized water, and dried. The powder was then calcined at 500° C. for 4 hours to obtain the product. The stoichiometric ratios of metal ions in the products (based on the molar ratio of metals in the reaction mixture) are shown in Table 1.

| Example No. | Ti | Al | Zr |
|---|---|---|---|
| 1 | 4 | 1 | 1 |
| 2 | 4 | 1 | 2 |
| 3 | 4 | 1 | 4 |
| 4 | 4 | 1 | 8 |

ICP analysis of Example 3 gave an actual chemical formula of $Ti_{4.7}AlZr_{2.5}O_{15.9}$.

Example 5

A Ti—Al—Zr—O metal oxide column was prepared by taking a 5.5 mm polypropylene tube, sealing one end with a polypropylene membrane that contained the powder, and dry adding 100 mg of the product of Example 3. The column was washed by adding 1 mL of deionized water, centrifuging at >2,000 rpm for 5 minutes, adding 1 mL of 50% methanol, and centrifuging at >2,000 rpm for 5 minutes. The column was dried before use.

A 1 mL aliquot of corn extract from Preparatory Example 1 was spiked with 10 ppm dexynivalenol and added to the Ti—Al—Zr—O metal oxide column. The column was placed in a receiver tube and centrifuged at >5,000 rpm until all the liquid passed through the bed. The eluent was then analyzed by HPLC using the following conditions:
Flow: 0.600 mL/min
Injection Volume: 35 microliters
Column: C 18 3×150 mm 3.5 micron (available under the trade designation Zorbax Eclipse Plus)
Column Temperature: 25° C.
Detector: UV (218 nm)
Mobile Phase: 9:1 Water:Acetonitrile
Run Time: 7 minutes The elugram showed a clear peak at 4.1 minutes corresponding to the dexynivalenol. The peak was visible baseline to baseline, with no overlap between the leading or tailing ends of the peak and any other peak in the elugram. The dexynivalenol concentration in the analyzed aliquot was 10.391, which equates to full recovery of the dexynivalenol within the error of the analytical technique (105% calculated recovery.)

Comparative Example 1

Dried field corn was ground in a Romer Series II Mill. Five grams of the ground corn was added to 25 mL of an SDS extraction solution (described in Maragos, C. M., 2008 Extraction of Aflatoxin B1 and G1 from Maize using Aqueous Sodium Didecylsulfate (SDS), Journal of Association of Official Analytical Chemists International, 91(4):762-767.) The mixture was shaken by repeated inversion for 5 minutes and spiked with 10 ppm deoxynivalenol. An aliquot of the extract was centrifuged at >5,000 rpm and the supernatant decanted to remove any solids. A 1 mL portion of the supernatant was added to 1 mL of HPLC grade acetonitrile. Once mL of the resulting mixture was applied to a column available from Romer as catalog #COCMY2230 under the trade designation "Mycosep." The column was placed in a receiving tube and centrifuged at >5,000 g until all of the liquid passed through the column. The eluent was diluted 1:1 a 50% methanol, then analyzed by HPLC using the same conditions as described with respect to Example 2.

The elugram showed the deoxynivalenol peak at 4.1 minutes that strongly overlapped with a fronting peak. Quantification of the deoxynivalenol concentration was not performed because of this overlap.

Example 6

A Ti—Al—Zr—O column was prepared substantially as described in Example 2, but using 240 mg of the product of Example 4 instead of 100 mg.

The corn extract of Preparatory Example 1 was spiked with 500 ppb aflatoxin B1. A 1 mL portion of the resulting solution was added to the Ti—Al—Zr—O column. The column was placed in a receiver tube and centrifuged at >5,000 rpm until all of the liquid passed through the column. The eluent was analyzed by HPLC under the following conditions:
Flow: 0.500 mL/min
Injection Volume: 20 microliters
Column: C 18 3×150 mm 3.5 micron (available under the trade designation Zorbax Eclipse Plus)
Column Temperature: 25° C.
Detector: Fluorescence (365 nm excitation; 435 nm detection)
Mobile Phase: 1:1:2 methanol:acetonitrile:water
Run Time: 10 minutes The resulting elugram showed a clearly detectable peak corresponding to aflatoxin B1 at 7 minutes. The peak was visible baseline to baseline, with no overlap between the leading or tailing ends of the peak and any other peak in the elugram. The concentration of aflatoxin B1 in the analyzed aliquot was 97% of the original concentration of the spiked extract.

Comparative Example 2

Dried corn matrix was prepared, extracted, treated, and passed through a column substantially as described in Comparative Example 1, except that the column was obtained under the trade designation MycoSep 226 AfalZON+. The eluent was diluted as described in Comparative Example 1 and analyzed by HPLC under the conditions described under Example 3.

The resulting elugram showed a clearly detectable peak corresponding to aflatoxin B1 at 7 minutes. The peak was visible baseline to baseline, with no overlap between the leading or tailing ends of the peak and any other peak in the elugram. The concentration of aflatoxin B1 in the analyzed aliquot was 100% of the original concentration of the spiked extract.

What is claimed is:

1. A Ti—Al—Zr—O metal oxide having the formula $Ti_xAl_yZr_zO_n$, wherein x is independently 3-10, y is independently 0.5-5, z is independently 3-10, and n is independently $2x+(3y/2)+2z$.

2. The Ti—Al—Zr—O metal oxide of claim 1, wherein x is 3-5.

3. The Ti—Al—Zr—O metal oxide of claim 1, wherein y is 0.75-3.

4. The Ti—Al—Zr—O metal oxide of claim 1, wherein y is 2-5.

5. The Ti—Al—Zr—O metal oxide of claim 1, wherein z is 7-9.

6. The Ti—Al—Zr—O metal oxide of claim 1, wherein z is 7.5-8.5.

7. The Ti—Al—Zr—O metal oxide of claim 1, wherein the Ti—Al—Zr—O metal oxide has the chemical formula $Ti_8Al_2Zr_8O_{35}$, where x is 8, y is 2, z is 8, and, subsequently, n is 35.

\* \* \* \* \*